United States Patent
Truong et al.

(10) Patent No.: US 12,415,321 B2
(45) Date of Patent: Sep. 16, 2025

(54) FORCE-REGULATED ADDITIVE MANUFACTURING

(71) Applicant: Carbon, Inc., Redwood City, CA (US)

(72) Inventors: Ronald Truong, San Mateo, CA (US); Daniel Jiaji Yang, San Francisco, CA (US)

(73) Assignee: Carbon, Inc., Redwood City, CA (US)

( * ) Notice: Subject to any disclaimer, the term of this patent is extended or adjusted under 35 U.S.C. 154(b) by 231 days.

(21) Appl. No.: 18/256,884

(22) PCT Filed: Dec. 10, 2021

(86) PCT No.: PCT/US2021/062783
§ 371 (c)(1),
(2) Date: Jun. 9, 2023

(87) PCT Pub. No.: WO2022/125881
PCT Pub. Date: Jun. 16, 2022

(65) Prior Publication Data
US 2024/0017497 A1     Jan. 18, 2024

Related U.S. Application Data

(60) Provisional application No. 63/137,316, filed on Jan. 14, 2021, provisional application No. 63/124,256, filed on Dec. 11, 2020.

(51) Int. Cl.
*B29C 64/393*     (2017.01)
*B29C 64/124*     (2017.01)
(Continued)

(52) U.S. Cl.
CPC .......... *B29C 64/393* (2017.08); *B29C 64/124* (2017.08); *B29C 64/232* (2017.08);
(Continued)

(58) Field of Classification Search
None
See application file for complete search history.

(56) References Cited

U.S. PATENT DOCUMENTS

| 5,122,441 A | 6/1992 | Lawton et al. |
| 5,182,715 A | 1/1993 | Vorgitch et al. |

(Continued)

FOREIGN PATENT DOCUMENTS

| EP | 2011631 A1 | 1/2009 |
| EP | 2043845 A1 | 4/2009 |

(Continued)

OTHER PUBLICATIONS

International Search Report and Written Opinion for PCT/US2021/062783 mailed May 23, 2022, 21 pages.

(Continued)

*Primary Examiner* — Yung-Sheng M Tsui
(74) *Attorney, Agent, or Firm* — Myers Bigel, P.A.

(57) ABSTRACT

A method of forming a three-dimensional object (31) includes the steps of: (a) providing an apparatus including a carrier (15), a light transmissive window (12) having a build surface, polymerizable liquid (21) on the build surface, and a growing object (31) on the carrier, the growing object produced by light polymerization of the polymerizable liquid; (b) vertically reciprocating the carrier (15) with respect to the build surface in an upstroke and a downstroke, the downstroke being shorter than the upstroke, to form a build region between the growing object and the build surface, and to fill the build region with the polymerizable liquid, while also: (i) sensing force exerted between the carrier and the build surface through the growing object (31) and the polymerizable liquid (21) during the upstroke; and (ii) modifying the speed, acceleration, or both speed and acceleration of the upstroke in response to the sensed force so that the sensed force approaches a predetermined target force;

(Continued)

then (c) irradiating the build region with light through the light transmissive window to form a new portion of the object from the polymerizable liquid on the growing object; and then (d) repeating steps (b) through (c) to form additional portions on the growing object until the three-dimensional object is formed.

14 Claims, 10 Drawing Sheets

(51) Int. Cl.
    *B29C 64/232*     (2017.01)
    *B29C 64/245*     (2017.01)
    *B33Y 10/00*     (2015.01)
    *B33Y 30/00*     (2015.01)
    *B33Y 50/02*     (2015.01)

(52) U.S. Cl.
    CPC ............ *B29C 64/245* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 5,236,637 A | 8/1993 | Hull |
| 5,391,072 A | 2/1995 | Lawton et al. |
| 7,438,846 B2 | 10/2008 | John |
| 7,709,544 B2 | 5/2010 | Doyle et al. |
| 7,845,930 B2 | 12/2010 | Shkolnik et al. |
| 7,892,474 B2 | 2/2011 | Shkolnik et al. |
| 8,110,135 B2 | 2/2012 | El-Siblani |
| 8,845,316 B2 | 9/2014 | Schillen et al. |
| 9,067,361 B2 | 6/2015 | El-Siblani |
| 9,205,601 B2 | 12/2015 | Desimone et al. |
| 9,211,678 B2 | 12/2015 | Desimone et al. |
| 9,216,546 B2 | 12/2015 | Desimone et al. |
| 9,360,757 B2 | 6/2016 | Desimone et al. |
| 9,434,107 B2 | 9/2016 | Zenere |
| 9,453,142 B2 | 9/2016 | Rolland et al. |
| 9,498,920 B2 | 11/2016 | Desimone et al. |
| 9,598,606 B2 | 3/2017 | Rolland et al. |
| 9,676,963 B2 | 6/2017 | Rolland et al. |
| 9,993,974 B2 | 6/2018 | Desimone et al. |
| 10,011,076 B2 | 7/2018 | El-Siblani et al. |
| 10,016,938 B2 | 7/2018 | Desimone et al. |
| 10,093,064 B2 | 10/2018 | Desimone et al. |
| 10,144,181 B2 | 12/2018 | Desimone et al. |
| 10,144,205 B2 | 12/2018 | El-Siblani |
| 10,150,253 B2 | 12/2018 | Desimone et al. |
| 10,220,565 B2 | 3/2019 | El-Siblani |
| 10,300,663 B2 | 5/2019 | El-Siblani et al. |
| 10,569,526 B2 | 2/2020 | Frantzdale et al. |
| 10,596,755 B2 | 3/2020 | Desimone et al. |
| 10,618,215 B2 | 4/2020 | Desimone et al. |
| 10,647,055 B2 | 5/2020 | Wynne et al. |
| 10,933,580 B2 | 3/2021 | Truong |
| 11,117,315 B2 | 9/2021 | Feller et al. |
| 11,141,909 B2 | 10/2021 | Kuijpers et al. |
| 11,169,067 B2 | 11/2021 | Medalsy |
| 11,235,533 B2 | 2/2022 | Deetz et al. |
| 2009/0130449 A1 | 5/2009 | El-Siblani |
| 2009/0289384 A1 | 11/2009 | Maalderink et al. |
| 2011/0089610 A1 | 4/2011 | El-Siblani et al. |
| 2013/0292862 A1 | 11/2013 | Joyce |
| 2013/0295212 A1 | 11/2013 | Chen et al. |
| 2015/0331402 A1 | 11/2015 | Lin et al. |
| 2015/0360419 A1 | 12/2015 | Willis et al. |
| 2016/0136889 A1 | 5/2016 | Rolland et al. |
| 2017/0057174 A1 | 3/2017 | Megretski et al. |
| 2017/0129167 A1 | 5/2017 | Castanon |
| 2017/0129169 A1 | 5/2017 | Batchelder et al. |
| 2017/0173871 A1* | 6/2017 | Ermoshkin ........... B29C 64/393 |
| 2017/0368747 A1 | 12/2017 | Nolet et al. |
| 2018/0236710 A1 | 8/2018 | Turner |
| 2018/0345584 A1 | 12/2018 | Tanner |
| 2019/0016050 A1 | 1/2019 | Stadlmann |
| 2019/0111622 A1 | 4/2019 | Khalip |
| 2019/0126536 A1 | 5/2019 | Thompson |
| 2019/0126547 A1 | 5/2019 | Desimone et al. |
| 2019/0134899 A1 | 5/2019 | Mueller et al. |
| 2019/0160733 A1 | 5/2019 | Mirkin et al. |
| 2019/0291347 A1 | 9/2019 | Price et al. |
| 2019/0322033 A1 | 10/2019 | Willis et al. |
| 2019/0389127 A1 | 12/2019 | Desimone et al. |
| 2020/0001525 A1 | 1/2020 | Wynne et al. |
| 2020/0001536 A1 | 1/2020 | Desimone et al. |
| 2020/0070408 A1 | 3/2020 | Elsey |
| 2020/0139617 A1 | 5/2020 | Desimone et al. |
| 2020/0338830 A1 | 10/2020 | Deetz et al. |
| 2021/0031458 A1 | 2/2021 | Ong et al. |
| 2021/0293351 A1 | 9/2021 | Dragomirescu et al. |
| 2022/0176622 A1* | 6/2022 | Lin ........................ B29C 64/20 |
| 2022/0402211 A1* | 12/2022 | Stadlmann ............ B29C 64/124 |
| 2023/0053973 A1 | 2/2023 | Truong et al. |

FOREIGN PATENT DOCUMENTS

| | | |
|---|---|---|
| EP | 3428585 A1 | 1/2019 |
| JP | 2009542484 A | 12/2009 |
| JP | 2011504819 A | 2/2011 |
| WO | 0172501 A1 | 10/2001 |
| WO | 2011086450 A2 | 7/2011 |
| WO | 2015031227 A1 | 3/2015 |
| WO | 2016140891 A1 | 9/2016 |
| WO | 2018111533 A1 | 6/2018 |

OTHER PUBLICATIONS

"Dental catalogue, SHERAdigital, 2017, 82 pages."
"Product Brochure, W2P Professional Desktop 3D Printers, W2P Engineering GmbH, formnext, International exhibition conference on the next generation of manufacturing technologies, Frankfurt, Germany, Nov. 14-17, 2017, 8 pages."
Dendukuri, Dhananjay, et al., "Continuous-flow lithography for high-throughput microparticle synthesis", Nature Materials, 5, 2006, 365-369.
Dendukuri, Dhananjay, et al., "Modeling of Oxygen-Inhibited Free Radical Photopolymerization in a PDMS Microfluidic Device", Macromolecules, 41, 2008, 8547-8556.
Dendukuri, Dhananjay, et al., "Stop-flow lithography in a microfluidic device", The Royal Society of Chemistry, Lab on a Chip, 7, 2007, 818-828.
Morelli, Dean, "Protest to Canadian Patent Applications by Joseph DeSimone et al", Regarding Continuous Liquid Interphase Printing. Canadian patent applications CA2898098A1, CA 2898103A1, and CA2898106A1. Dec. 31, 2015. Canadian Intellectual Property Office, (37 pages).
Pan, Yayue, et al., "A Fast Mask Projection Stereolithography Process for Fabricating Digital Models in Minutes", J. Manufacturing Sci. and Eng. 134(5), 2012, 051011-1-9.
Stern, S. A., "The "Barrer" Permeability Unit", Journal of Polymer Science: Part A-2, 6(11), 1968, 1933-1934.
Tumbleston, John R., et al., "Continuous liquid interface production of 3D Objects", Science, 347(6228), 2015, 1349-1352.
Yasuda, H., et al., "Permeability of Polymer Membranes to Dissolved Oxygen", Journal of Polymer Science, 4, 1966, 1314-1316.

* cited by examiner

FIGURE 6A: 50% Distribution

FIGURE 6B: 61.8% Distribution

FIGURE 6C: 73.6% Distribution

FIGURE 6D: 97.3% Distribution

FIGURE 7A: Force measurements for varying distributions of controlled debris

FIGURE 7B: Force measurements for varying distributions of controlled debris.

FIGURE 8A: Comparing force model error to baseline model with no debris.

FIGURE 8B: Comparing Force model error to baseline model with no debris.

FORCE-REGULATED ADDITIVE MANUFACTURING

RELATED APPLICATIONS

This application is a 35 U.S.C. § 371 national phase entry of International Application No. PCT/US2021/062783, filed Dec. 10, 2021, which claims priority from U.S. Provisional Application No. 63/124,256, filed Dec. 11, 2020, and U.S. Provisional Application No. 63/137,316, filed Jan. 14, 2021, the disclosures of which are hereby incorporated by reference in their entireties.

BACKGROUND

A group of additive manufacturing techniques sometimes referred to as "stereolithography" creates a three-dimensional object by the sequential polymerization of a light polymerizable resin. Such techniques may be "bottom up" techniques, where light is projected into the resin on the bottom of the growing object through a light transmissive window with the object being elevated upward on a build platform, or "top down" techniques, where light is projected onto the resin on top of the growing object, which is then immersed downward into a large pool of resin. Bottom up techniques are preferred, as a large pool of resin is not required.

The recent introduction of a more rapid bottom up stereolithography technique known as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). Accordingly there is a need for new methods and apparatus for bottom up additive manufacturing that are suitable for industrial and manufacturing use.

SUMMARY

Some embodiments of the present invention are directed to an apparatus for forming a three-dimensional object from a polymerizable liquid, including: (a) an elevator assembly; (b) a carrier operatively associated with the elevator assembly on which carrier the three-dimensional object is formed; (c) a light-transmissive window having a build surface, with the build surface and the carrier defining a build region therebetween; (d) a liquid polymer supply operatively associated with the build surface and configured to supply liquid polymer into the build region for solidification or polymerization; (e) a light source configured to irradiate the build region through the window to form a solid polymer from the polymerizable liquid; (f) a drive operatively associated with either the transparent member or the carrier; (g) a force sensor operatively associated with either the window or the carrier; and (h) a controller operatively associated with the carrier, the drive, and the light source for advancing the carrier away from the build surface to form the three-dimensional object from the solid polymer, the controller further configured to: (i) reciprocate the carrier vertically with respect to the build surface in an upstroke and downstroke to enhance or speed the refilling of the build region with the polymerizable liquid, and (ii) modify the speed, acceleration, or both speed and acceleration of the upstroke in response to force sensed by the force sensor so that the sensed force approaches a predetermined target force (e.g., by increasing the speed and/or acceleration when the sensed force is below the target force, and decreasing the speed and/or acceleration when the sensed force is above the target force).

In some embodiments, the build surface is fixed and stationary in the lateral (X and Y) dimensions.

In some embodiments, the force sensor includes a strain gauge.

Reciprocal feeding of polymerizable liquids (i.e., resins) is known and described in, for example, A. Ermoshkin et al., U.S. Pat. No. 10,471,699 (1151-10), the disclosure of which is incorporated herein by reference. Use of force feedback is neither suggested nor disclosed therein.

Force monitoring and feedback during reciprocal mode is described in, for example, R. Truong, US Patent Application Publication No. 20200180215 (published Jun. 11, 2020), the disclosure of which is incorporated herein by reference. Use of force feedback to modify velocity or acceleration of an upstroke is neither suggested nor disclosed therein. Instead, the force feedback information is used after upstroke and downstroke, to determine when to initiatiate an irradiation step.

In some embodiments, the methods and apparatus described herein reduce or eliminate the need for an operator to manually tune velocity and/or acceleration during reciprocal feed by trial-and error.

In some embodiments, the methods and apparatus described herein reduce the number of supports that must be added to an object for additive manufacturing, and/or enable the additive manufacturing of objects that typically self-destruct during production (for example, objects with unvented or heavily restricted cavities, flexible or elastic gaskets, parts shaped like a dam, etc.)

In some embodiments, the methods and apparatus described herein, facilitate the use of resins that produce objects with a low "green" strength.

In some embodiments, the methods and apparatus described herein help prevent the apparatus from overloading and damaging mechanical or structural components of the system (e.g., stripping drive gears, burning out motors, de-laminating windows, etc.).

Some other embodiments of the present invention are directed to a method of detecting a collision with a foreign object upon initiating a production cycle in a bottom-up additive manufacturing apparatus, including the steps of: (a) providing an additive manufacturing apparatus including a build platform, a light transmissive window, and at least two spaced apart force sensors operatively associated with the build platform or the window, with the window carrying a resin pool; (b) advancing the build platform and the window toward one another to initiate production of an object on the build platform from the resin pool; then (c) detecting a force difference between forces exerted on the at least two force sensors by the build platform and the window as an indication of a collision impact with a foreign object positioned between the build platform and the window; and (d) halting the advancing and/or generating an alarm signal when the collision impact is detected.

In some embodiments, the foreign object includes (i) a fallen object produced during a previous production cycle that remains on the window, (ii) a dangling object produced during a previous production cycle that remains adhered to the build platform, (iii) an extraneous object from a source other than a production cycle (e.g., a tool, a broken or loose apparatus part, workspace debris, etc.)

In some embodiments, step (d) includes generating a display on an operator interface indicating a foreign object has been detected on the window.

In some embodiments, step (d) is followed by the step of: (e) withdrawing said build platform to a retracted position at which an operator can access said window (and optionally, opening an access door on the apparatus so an operator can access the window).

In some embodiments, the apparatus includes a top deck and at least one lock operatively associated with the top deck, the lock configured to lock the window to the top deck, and step (e) is followed by the step of: (f) unlocking the window from the top deck (and optionally, unlocking the build platform from the apparatus).

In some embodiments, the method further includes: (g) detecting a uniform force exerted on the at least two force sensors by the build platform and the window as an indication that the build platform has contacted the resin pool with proper (i.e., nominal) alignment of said build platform with said window.

In some embodiments, the window includes a polymer film top portion on a rigid bottom portion, with the resin pool on the top portion.

In some embodiments, the window is stationary in the lateral (X, Y) dimensions.

In some embodiments, the force sensors include strain gauges.

In some embodiments, the at least two force sensors consist of 3 or 4 force sensors spaced apart from one another.

Some other embodiments of the present invention are directed to an apparatus useful for making a three-dimensional object from a polymerizable resin, comprising: (a) a build platform on which a three-dimensional object can be made; (b) a light transmissive window having a build surface operatively associated with the build platform, the build platform and the build surface defining a build region therebetween, the window configured to support a pool of resin thereon; (c) an elevator assembly operatively associated with the build platform and/or the window, the elevator assembly configured for advancing the build platform and said window away from one another to draw the polymerizable liquid into the build region; (d) a light engine operatively associated with the window and positioned to irradiate the build region with light to form a growing three-dimensional object from the resin; (e) at least two spaced apart force sensors operatively associated with the build platform and/or the window and configured to detect a force difference between forces exerted on the at least two force sensors by said build platform and the window upon advancing the build platform and the window toward one another (e.g., as an indication of a collision impact with a foreign object positioned between the carrier platform and the window); and (f) a controller operatively associated with the at least two force sensors, the build platform, and the light engine, the controller configured to halt advancing of the build platform and the window toward one another upon detecting a force difference between the at least two force sensors.

In some embodiments, the apparatus includes a top deck positioned above the light engine and at least one lock operatively associated with the top deck, the lock configured to lock the window to the top deck, In some embodiments, the window is stationary in the lateral (X, Y) dimensions.

In some embodiments, the light engine includes a light source in combination with a patterning array.

In some embodiments, the force sensor includes a strain gauge.

The foregoing and other objects and aspects of the present invention are explained in greater detail in the drawings herein and the specification set forth below. The disclosures of all United States patent references cited herein are to be incorporated herein by reference.

DETAILED DESCRIPTION OF ILLUSTRATIVE EMBODIMENTS

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. Apparatus

Figure 1:
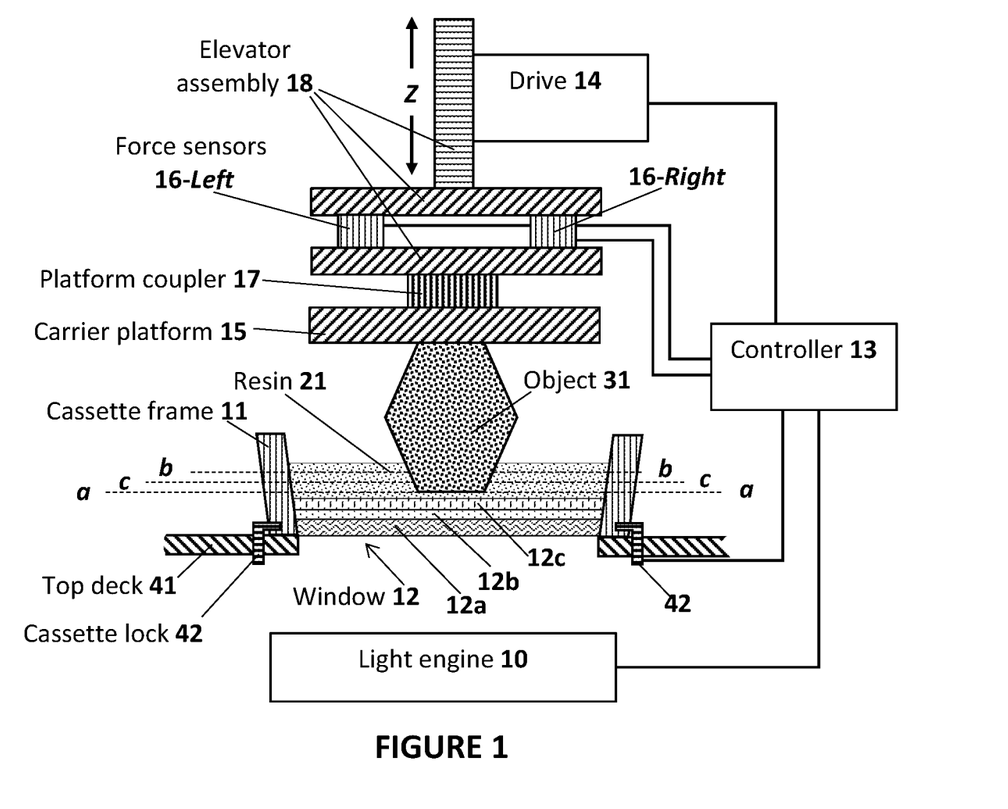
FIG. 1 schematically illustrates an apparatus configured for carrying out the target force methods described herein.

FIG. 1 schematically illustrates a non-limiting example of an apparatus configured for carrying out the methods described herein. In general, the apparatus includes a light engine 10, a window (or "build plate") 12, a controller 13, a drive 14, and an elevator assembly 18. A carrier platform (or "carrier" or "carrier plate") 15 is mounted to the elevator and drive assembly by means of a platform coupler 17, but with a pair of force sensors 16-Left and 16-Right included in the elevator assembly in spaced-apart locations, such as at positions on opposite sides of the platform coupler, with the force sensors operatively associated with the controller. The window may be provided as a "cassette" having a frame 11, which cassette is removable from the overall apparatus as discussed further below.

Controller 13 may include, along with typical hardware and/or software, controls for operating the light engine and drive, and a force feedback controller. Suitable force feedback controllers include, but are not limited to, proportional-integral-derivative (PID) controllers, proportional integral (PI) controllers, dynamic matrix controllers (DMCs), model predictive controllers (MPCs), state space controllers, etc., including combinations thereof. See, e.g., U.S. Pat. Nos. 9,841,186 9,795,528; 9,766,287; 9,220,362.

A polymerizable liquid or resin 21 is provided on top of the window 12. A growing three-dimensional object 31 is formed on the carrier platform 15, which object has a bottom surface facing window 12 on which new portions of the object are sequentially formed (which bottom surface is typically immersed in resin 21). During vertical reciprocation, the object (and particularly the bottom surface) moves from an initial position shown by line a-a through an upstroke to a position shown by line b-b, and then returns, through a downstroke shorter than the upstroke, to a position shown by line c-c. The space between the window 12 and the bottom surface of the growing object defines a new build region, which is filled with fresh polymerizable resin 21 during the vertical reciprocation.

As noted above, a cassette (or "window cassette") is comprised of a window 12 and a cassette frame 11 surrounding the window. The window 12 may be impermeable or semipermeable to an inhibitor of polymerization (e.g. oxygen), depending on what specific technique for carrying out additive manufacturing is employed. Any suitable window may be used, but in some embodiments the window includes an upper polymer layer 12c, a lower rigid layer 12a, and optionally one or more intervening layers 12b such as for supplying an inhibitor of polymerization through the upper layer to the resin. In some embodiments the polymer layer 12c is comprised of a fluoropolymer that is permeable to oxygen.

Any suitable light engine 10, including any of a variety of light sources and/or patterning elements, may be used, including lasers (e.g., scanning lasers as in traditional stereolithography), liquid crystal display (LCD) panels, digital micromirror displays (DMDs), etc, associated with an appropriate light source or light sources. A single light engine may be used, or a tiled set of light engines may be used, depending on the size of the window 12 and the desired resolution.

While the schematic suggests that advancing is accomplished by raising the carrier on the elevator, note also that advancing may be achieved by providing a fixed or static carrier, and by mounting the window and light engine on an elevator beneath the same, which can then be lowered.

Any suitable device may be used as force sensors 16-Left and 16-Right. Examples include, but are not limited to, mechanical tactile sensors, capacitive force sensors, metal strain gauges, semiconductor strain gauges, conductive elastomers, carbon felt and carbon fiber sensors, piezoelectric force sensors, pyroelectric force sensors, optical force sensors, magnetic force sensors, ulotrasonic force sensors, electrochemical force sensors, etc., including combinations thereof. See, e.g., Matthias Fassler, *Force Sensing Technologies* (Swiss Federal Institute of Technology Zurich, Spring Term 2010). One suitable example is the Omega LCM202-1KN Miniature Metric Universal Load Cell, available from Omega Engineering, Inc. (800 Connecticut Ave., Suite 5N01, Norwalk, Connecticut 06854 USA). Any suitable configuration of the force sensor or load cell may be used, including but not limited to a single load cell mounted (or "sandwiched") in-line between the carrier and the elevator. In addition, force sensing can be carried out by sensing motor current or torque, or any other direct or indirect measure of force.

An apparatus can include a top deck 41 to which a removable window cassette is affixed. Such window cassettes are known and examples include, but are not limited to, those set forth in I. Bennett, PCT Patent Application WO 2020/069281 (2 Apr. 2020). The apparatus can include locks 42 connected to the top deck 41, which locks are operatively associated with and controlled by the controller to lock and unlock the window cassette to the top deck. Any suitable lock mechanism can be used, such as pallet clamps (with associated draw-in pins on the bottom surface of the window cassette) such as described in, for example, U.S. Pat. Nos. 8,066,289; 6,283,465; and 5,961,261.

2. Methods

A method of forming a three-dimensional object, which in some embodiments can be carried out with a method as described above, includes the steps of:
(a) providing an apparatus comprising a carrier, a light transmissive window having a build surface, polymerizable liquid on the build surface, and a growing object on the carrier, the growing object produced by light polymerization of the polymerizable liquid (i.e., this is the status of the apparatus after the first, or immediately preceding, slice exposure),
(b) vertically reciprocating the carrier with respect to the build surface in an upstroke and a downstroke, the downstroke being shorter than the upstroke, to form a build region between the growing object and the build surface, and to fill the build region with the polymerizable liquid, while also:
  (i) sensing force (e.g., with a force sensor) exerted between the carrier and the build surface through the growing object and the polymerizable liquid during the upstroke; and
  (ii) modifying the speed, acceleration, or both speed and acceleration of the upstroke in response to the sensed force (e.g., with a controller responsive to the force sensor) so that the sensed force approaches a predetermined target force (e.g., increasing the speed and/or acceleration when the sensed force is below the target force, and decreasing the speed and/or acceleration when the sensed force is above the target force); then
(c) irradiating the build region with light through the light transmissive window to form a new portion of the object from the polymerizable liquid on the growing object, and then
(d) repeating steps (b) through (c) to form additional portions on the growing object until the three-dimensional object is formed.

In some embodiments, the method includes (i) determining the surface area of the growing object facing said window during said vertically reciprocating step; and (ii) modifying said target force based on said determined surface area.

In some embodiments, the modifying step includes at least modifying the acceleration of the upstroke.

In some embodiments, the light polymerization of the polymerizable liquid is exothermic, and the viscosity of the polymerizable liquid decreases as the polymerizable liquid is thereby heated during successive repitations of the steps (b) and (c).

In some embodiments, the window comprises a removable window cassette, and the target force is determined at least in part by the specific composition of the window cassette, including but not limited to the layers or laminate structure within the window, the chemical composition of particular layers, etc.

In some embodiments, the target force is determined at least in part by the specific composition of the light polymerizable liquid (i.e., resin type), including but not limited to resin characteristics such as resin viscosity.

In some embodiments, the growing object is frangible (susceptible to ripping and/or tearing) (and in some embodiments comprises supports and/or lattice struts).

In some embodiments, the final mechanical (e.g., tensile) properties of the three-dimensional object are degraded by excessive application of force greater than the target force during production thereof (e.g., as can be the case when certain resins are used.

In some embodiments, the vertically reciprocating step is carried out while maintaining a liquid interface between the growing object and the light transmissive window, the liquid interface comprising the polymerizable liquid.

In some embodiments of the method, the polymerizable liquid comprises a dual cure polymerizable liquid, examples of which include but are not limited to those set forth in U.S. Pat. Nos. 9,676,963, 9,453,142 and 9,598,606.

In some embodiments of the method, the build surface is fixed and stationary in the lateral (X and Y) dimensions.

Figure 2:
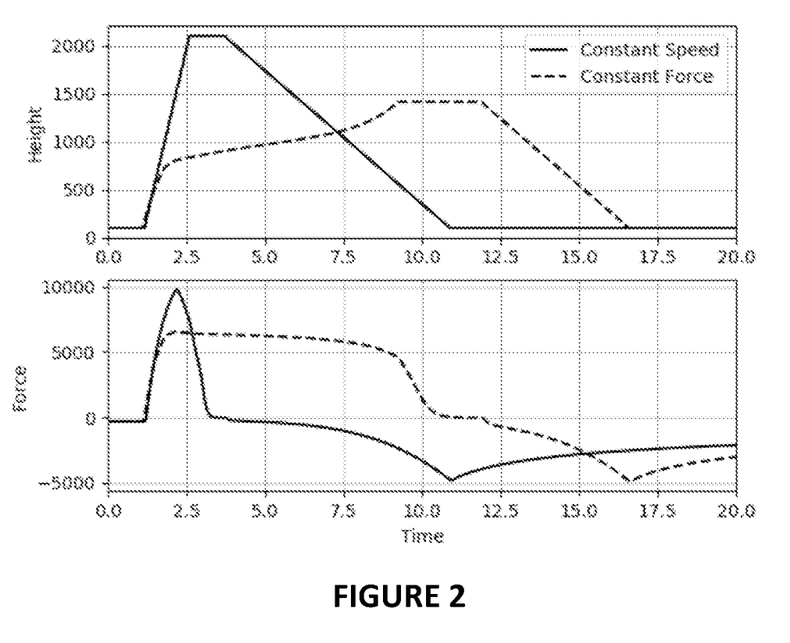
FIG. 2 compares the force regulated reciprocal feed upstroke with the prior art (constant speed) reciprocal feed upstroke.

FIG. 2 compares a representative force regulated reciprocal mode upstroke with a representative, prior art, constant speed reciprocal mode upstroke. The force regulated controller can quickly bring the force up to the target, and hold the force at the target until force unloading (indicating resin filling of the build region) is detected. The force regulated method allows for reduced forces on both the apparatus itself and on the object being produced.

Figure 3:
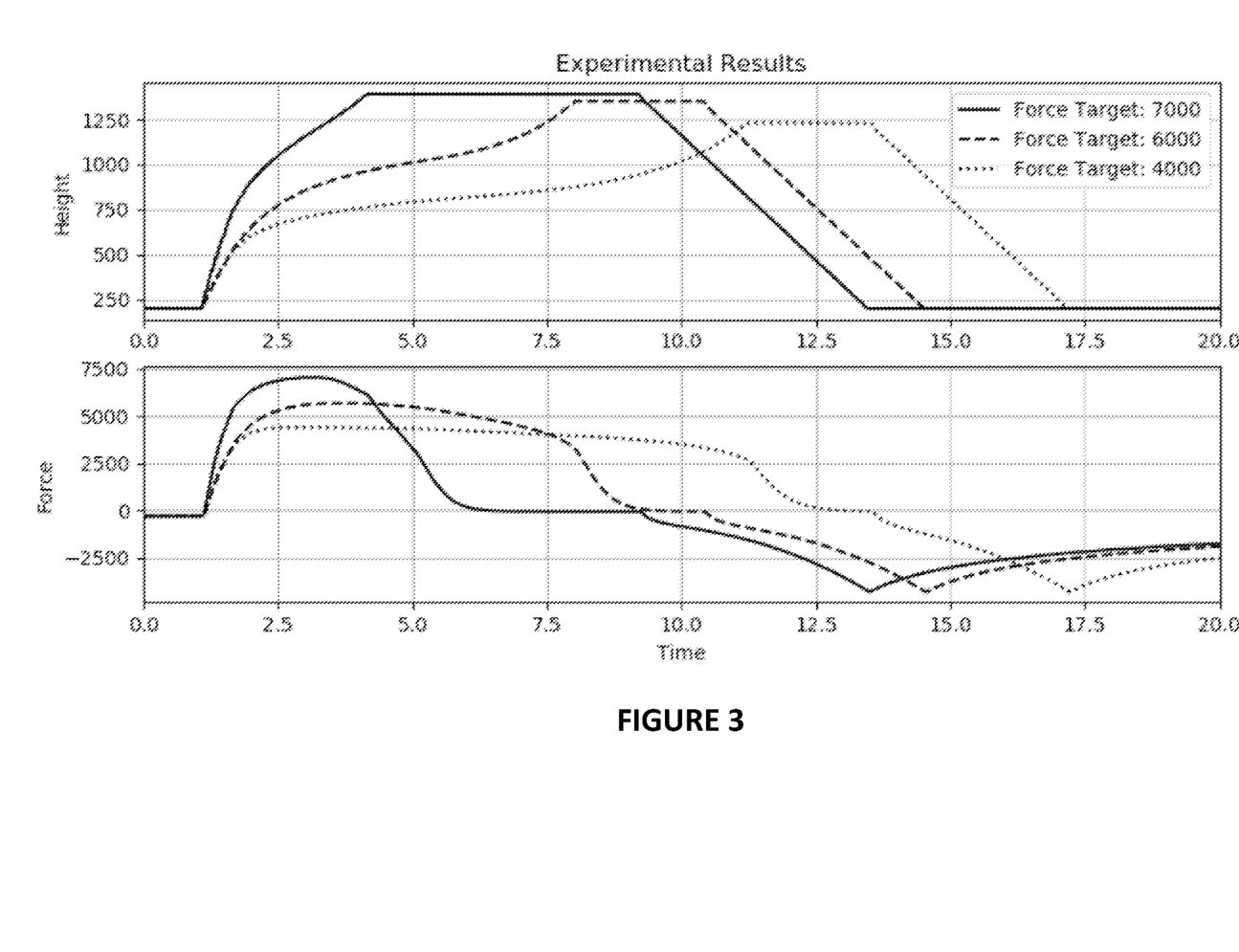
FIG. 3 shows the experimental results of three different constant force targets.

FIG. 3 shows the experimental results of three different constant force targets during reciprocal feed (upstroke and downstroke) in bottom up additive manufacturing apparatus, with the upper chart representing carrier platform height, and the lower chart representing measured force. For these experiments the downstroke was the same distance as the upstroke, and force feedback was implemented during the upstroke (hence, the linear return to 250 base during the downstroke). Note the acceleration and de-acceleration of speed in the upper graph as compared to detected force in the lower graph. Without force feedback, conservative upstroke speeds and accelerations would be required, and/or best speeds or accelerations would need to be experimentally determined (with different experimental determinations required in different regions of the part that present different print surface areas)

In some embodiments, the method may further include the steps of (i) determining the surface area of the growing object facing the window during the vertically reciprocating step; and (ii) modifying the target force based on the determined surface area. For example, the target force can be lowered when the contact area is large, and/or raised when the contact area is small. Smaller or larger areas can be determined by any suitable technique, such as by comparison to a standard surface area. The extent of modification can likewise be determined by any suitable technique, such as by a standard model, an empirically determined data set of target forces for different surface area dimensions, optionally based on specific constructions or compositions of the underlying light transmissive window, etc.

Figure 4:
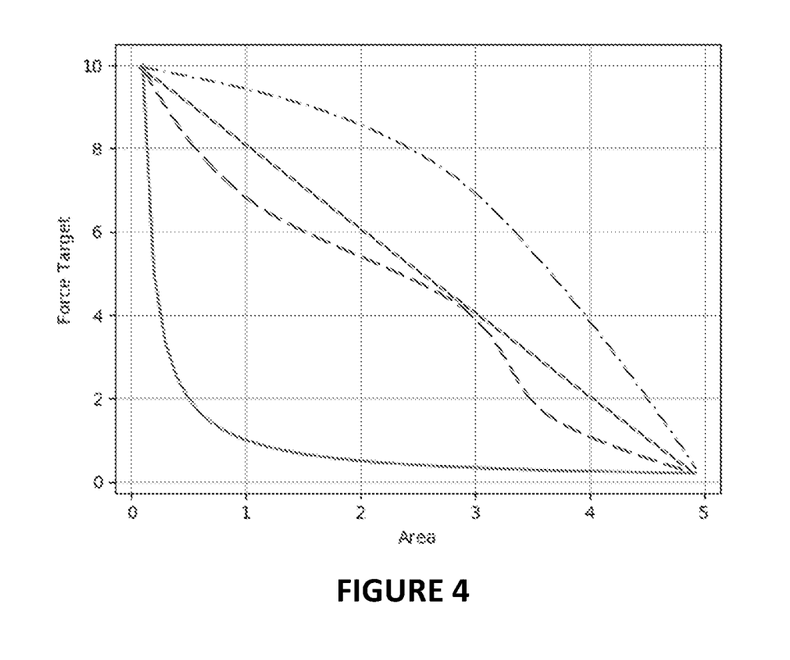
FIG. 4 is a graph showing, by the solid, dotted, and two different dashed lines, non-limiting examples of how target force can be modified based on the window-facing surface area of the growing object.

Examples of modifications of target force for contact surface are given in FIG. 4. In some embodiments, the standard equation of force equals pressure multiplied by area can be used. For example, with a known surface contact area for printing, a sate or appropriate maximum suction pressure parameter can be chosen, and force can be solved for using that parameter in the controller. For such an embodiment, the general curve shape would be analogous toy=1/x, as represented by the solid line in FIG. 4, while other relationships following simpler models, or empirically determined data, may be represented by the dotted and dashed lines in FIG. 4. To summarize the relationships, if the printed surface area is infinitely small, then that means the printing process can be infinitely fast, but with parts presenting a larger print area, lower force targets are desired to minimize part damage/failure (at least while the larger areas are presented for printing).

3. Collision Detection in Additive Manufacturing

When bottom up additive manufacturing machines are used for manufacturing, it can be important to have a way to detect foreign objects that may be in the machine as a new production cycle is initiated. Otherwise, advancing the build platform towards the window may damage the window (or other parts of the machine) when the foreign object is pressed down into the window. A method and apparatus for detecting such a foreign object with a force sensor is shown in R. Truong and S. Katzman, Resin level detection in additive manufacturing, PCT Application WO 2020/176487 (Sep. 3, 2020). This method, however, cannot indicate where on a window a foreign object may be—knowledge of location of the object may be helpful to the operator in clearing out the foreign object that is immersed in the viscous resin pool. In addition, when utilizing a single force sensor as described therein, an algorithm is required to compare observed forces against a model of expected forces, resulting in computational inefficiencies in the system. New approaches for detecting collisions in such apparatus are therefore required.

Some aspects of the methods and apparatus described herein may be implemented as described in R. Truong, Continuous Liquid Interface Production with Force Monitoring and Feedback, PCT Patent Application WO 2018/111533 (Jun. 21, 2018) and US Patent Application Publication No. 2020/0180215 and R. Truong and S. Katzman, supra. Additional features and aspects can be implemented as described further below.

Figure 5:
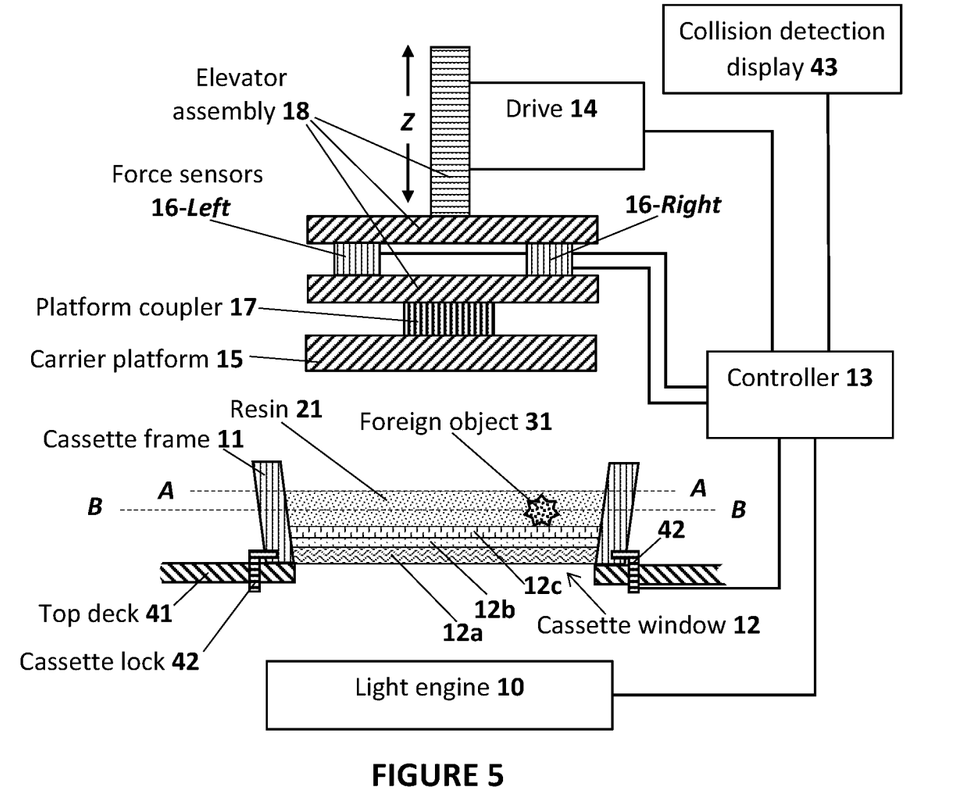
FIG. 5 schematically illustrates an apparatus configured for carrying out the collision detection methods described herein.
Figure 6A:
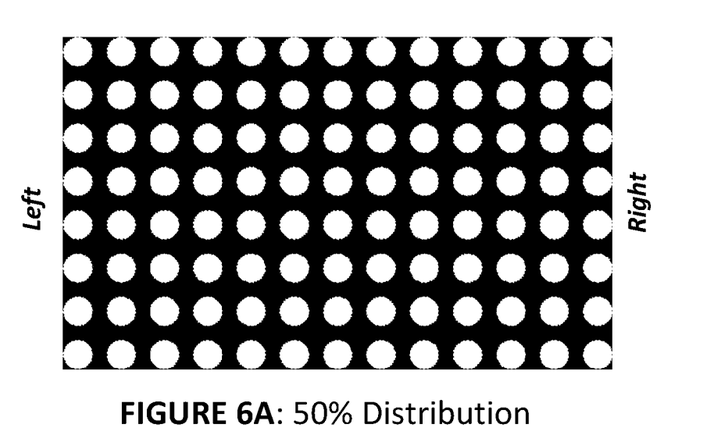
FIG. 6A shows slices for printing an even (50%) distribution of experimental (foreign) objects for the purpose of demonstrating the methods and apparatus described herein. The percentage in this and FIGS. 7-9 describe the center of mass/centroid location of the foreign object (0%=>furthest to left, 50%=>center, 100%=>furthest to the right).
Figure 6B:
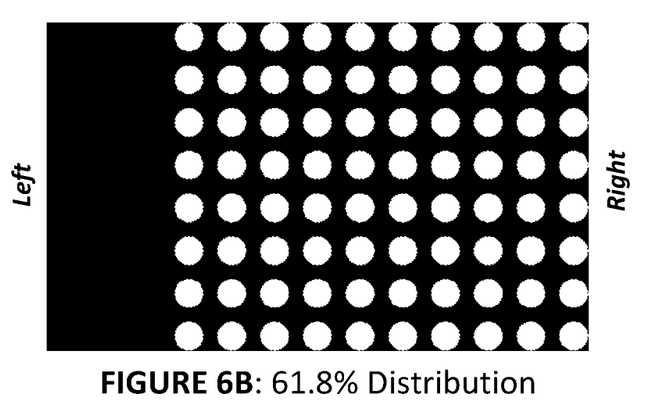
FIG. 6B is similar to FIG. 6A, except shows a 61.8 percent centroid location.
Figure 6C:
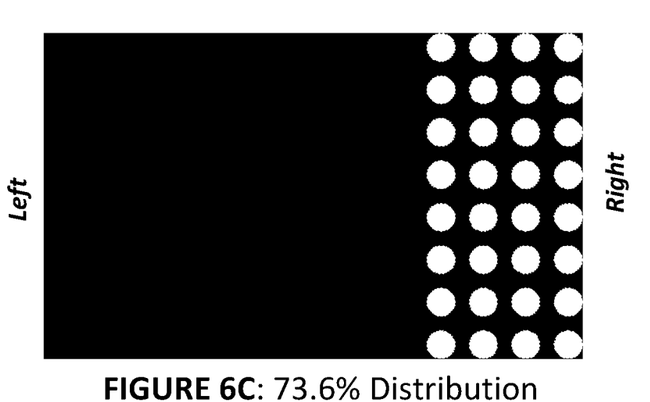
FIG. 6C is similar to FIG. 6A, except shows a 73.6 percent centroid location.
Figure 6D:
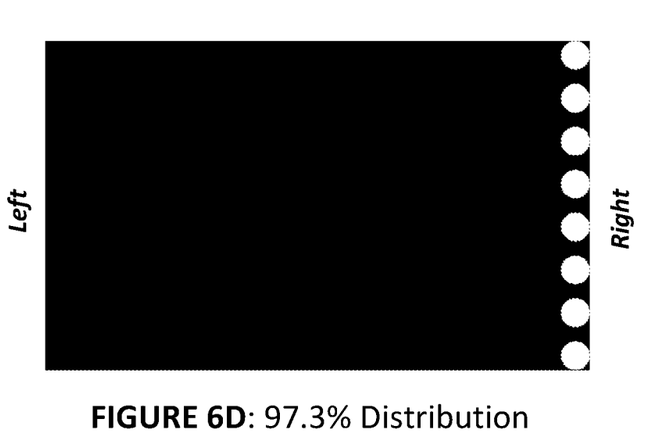
FIG. 6D is similar to FIG. 6A, except shows a 97.3 percent centroid location.

FIG. 5 schematically illustrates a non-limiting example of an apparatus configured for carrying out the methods described herein. The apparatus is substantially similar to the apparatus described above with regard to FIG. 1, but the polymerizable liquid or resin 21 is provided on top of the window 12, the resin having a current fill level A-A, which fill level is above the position to B-B to which the carrier platform is advanced to intiate production of one or more objects on the carrier platform in a new production cycle. Foreign object 31 is shown resting on the window, immersed in the resin pool beneath the current fill level, and hence obscured to an observer by the resin pool (though in some situations the object may protrude from the resin pool).

Also, a display 43 or user interface may be operatively associated with the controller through any suitable wired or wireless connection. The display may be a video monitor, an LED panel (e.g., with an array of LEDs such as a 3×3 array indicating different regions of the window), an application running on a smart phone, tablet, or other personal device, or the like.

With two or more force sensors such as described in FIG. 1 above and also shown in FIG. 5, it is possible to implement the following detection methods.

Figure 7A:
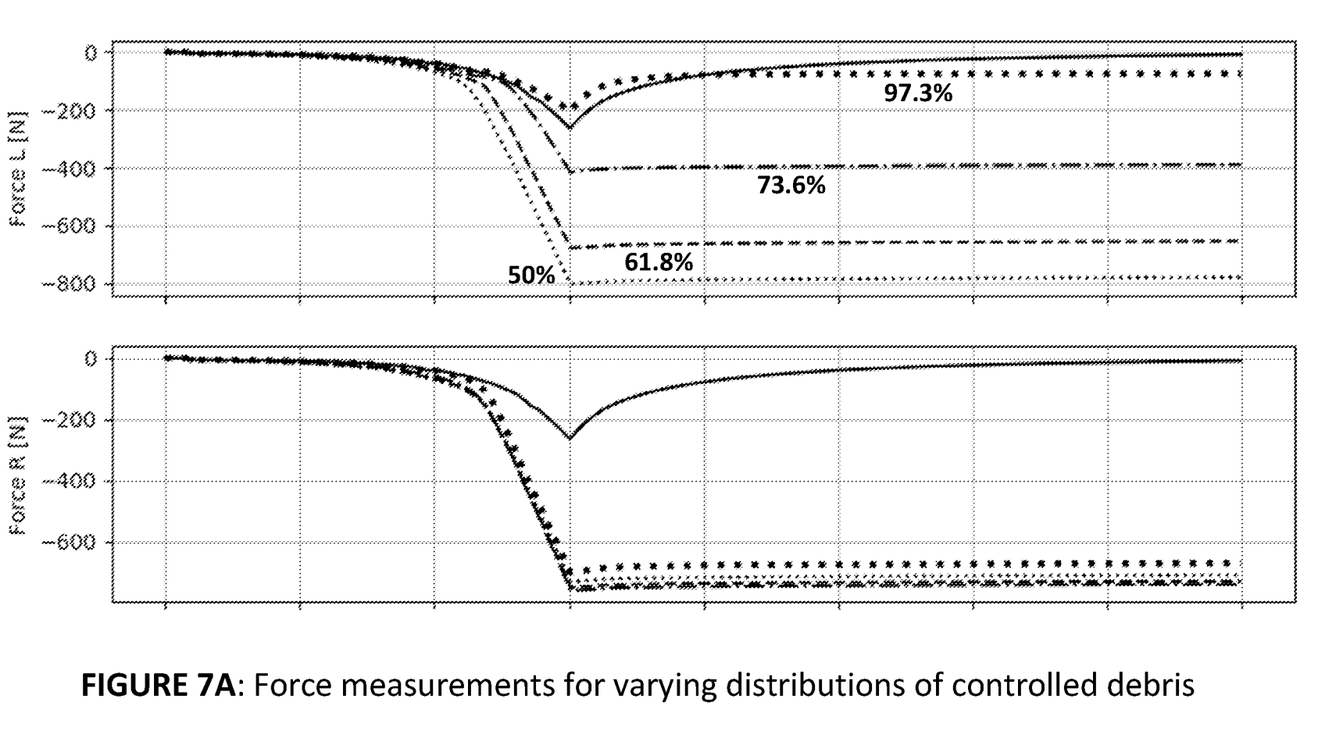
FIGS. 7A-7B show force measurements for varying distributions of controlled debris produced from the slices of FIGS. 6A-6D.
Figure 7B:
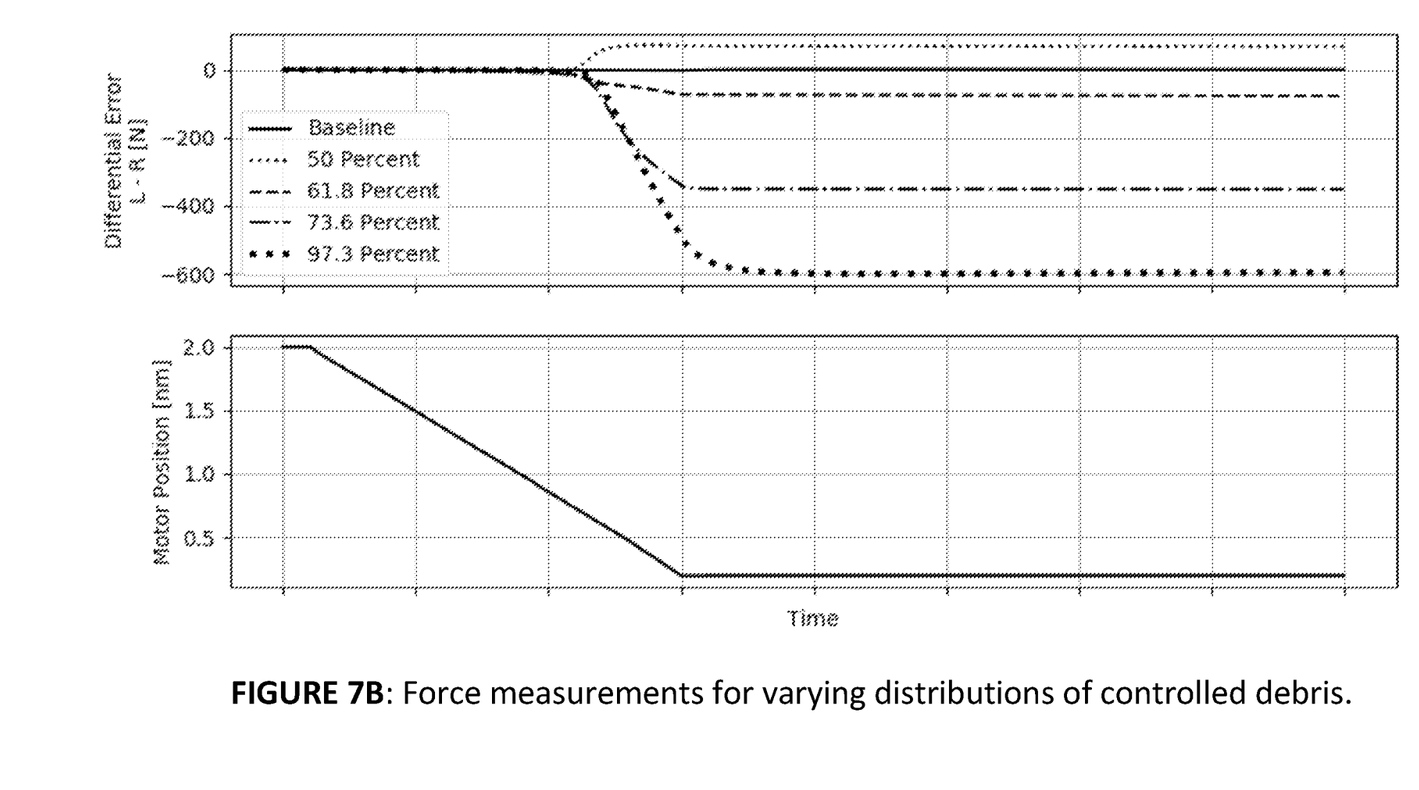

Method 1 (Model-less). Computing force differential error and comparing to a threshold. With two sensors (Left and Right), the apparatus can determine whether a non-uniform or off-centered load is applied on the system. Any off-centered debris causes non-uniform load, (as shown in FIG. 7A) and high differential error between the force sensors (as shown in FIG. 7B)

$$\text{abs}(\text{ForceDiff}_{Error}) < 100 \ N, \text{ where}$$
$$\text{ForceDiff}_{Error} = \text{Force}_L - \text{Force}_R$$

Instead of using a singular threshold, it is possible to define a model relationship between differential error and debris location. For example, a larger positive $\text{ForceDiff}_{Error}$ means the debris is on the left side and a larger negative $\text{ForceDiff}_{Error}$ means the debris is on the right side. The center of mass/centroid locations of the foreign object were varied by printing the slices shown in FIGS. 6A-6D.

Figure 9A:
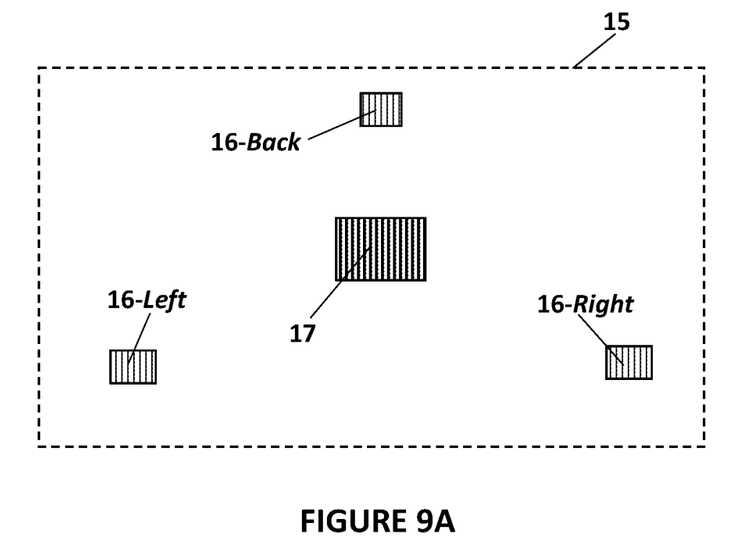
FIG. 9A is a plan view of an embodiment of the apparatus described herein with three spaced apart force sensors symmetrically arranged around a central build platform mount, the build platform itself being shown in phantom.
Figure 9B:
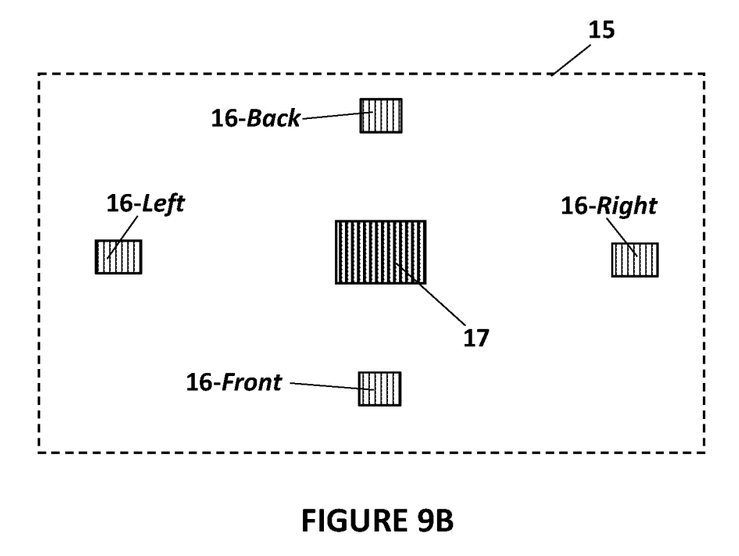
FIG. 9B is a plan view of an embodiment of the apparatus described herein with four spaced apart force sensors symmetrically arranged around a central build platform mount, the build platform itself being shown in phantom.

This relatively simple example can be supplemented with enhanced data analysis, regression analysis, and/or machine learning models. This approach can also be expanded with additional sensors (e.g., a total of three, four, or more spaced apart sensors, such as schematically illustrated in FIGS. 9A-9B) to attain further improved collision detection resolution and fidelity.

However, while foreign objects with a centered load are relatively rare, this method would not catch foreign objects with a centered load. Those, however, can be identified with method 2 below.

Method 2. Incorporating a simple calibration model to remove biases from an imperfect baseline alignment. A model can be made as follows:
(a) Measure baseline entry profile for left and right force sensors
(b) Convert left and right force sensors into a simple baseline model. The model can be a lookup table or a parametric model. Assume imperfect alignment is stable and consistent.

(c) On entry, compute calibrated forces:

$$\text{ForceError}_L = \text{Force}_L - \text{Force}_{L_{model}}$$

$$\text{ForceError}_R = \text{Force}_R - \text{Force}_{R_{model}}$$

$$\text{ForceError}_{Total} = (\text{Force}_L + \text{Force}_R) - (\text{Force}_{L_{model}} - \text{Force}_{R_{model}})$$

In a similar fashion to method 1, simple thresholds to trigger detection are defined. Separate thresholds and detection logic can be defined for $\text{ForceError}_L$, $\text{ForceError}_R$, and $\text{ForceError}_{Total}$. More example use cases of detection logic are:

Large $\text{ForceError}_L$ and small $\text{ForceError}_R$ error indicates a foreign object on left side of window.

Large $\text{ForceError}_R$ and small $\text{ForceError}_L$ error indicates a foreign object on right side of window.

Large $\text{ForceError}_{Total}$ error indicates foreign object somewhere on window.

Large $\text{ForceError}_{Total}$ error and similar magnitudes of error for $\text{ForceError}_L$ and $\text{ForceError}_R$ indicates foreign object near center of window.

Figure 8A:
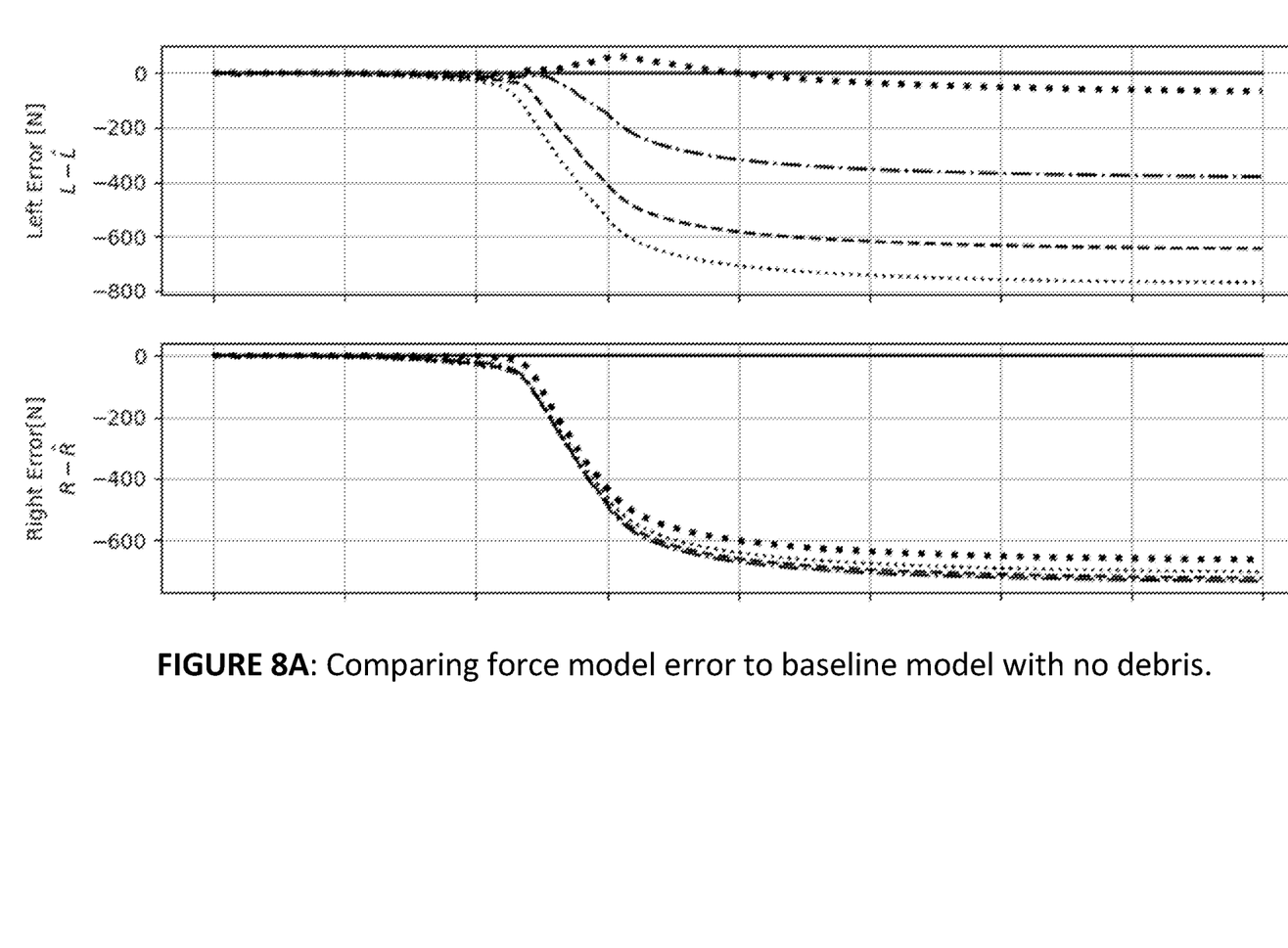
FIGS. 8A-8B show a comparison of force model errors to a baseline model with no debris. Note the pronounced deviation of Total Error for the 50 percent (centered) scenario from baseline in the top panel of FIG. 8B, indicating that centrally located foreign objects can be detected in this manner.
Figure 8B:
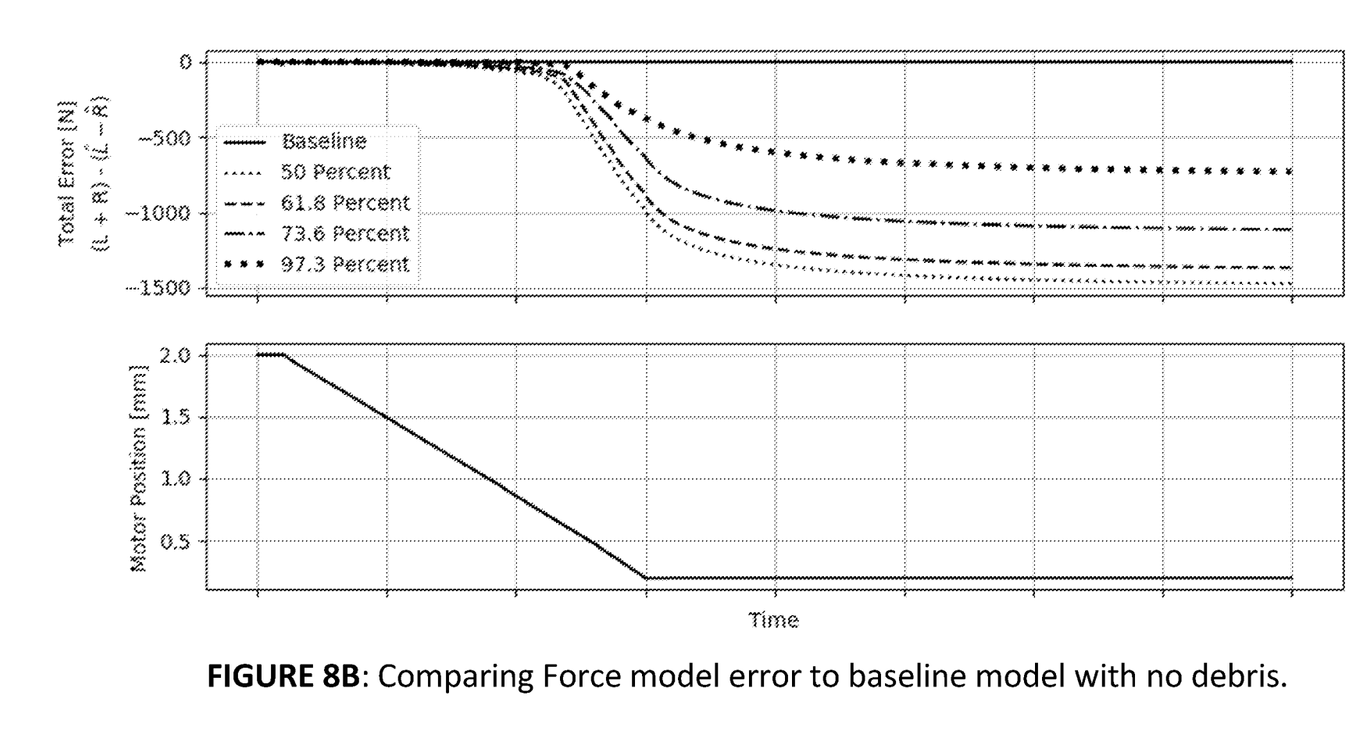

The model errors for the experimental arrays of FIGS. 6A-6D are shown in FIGS. 8A-8B.

Combining Methods 1 and 2. It can be optimal to combine some or all implementations described in methods 1 and 2 to take advantage of the pros of both model vs. model-less approaches. This can be shown as a logic chart where each method feeds a detection flag into one "OR" node.

While the embodiments discussed above employ 2 force sensors, they may be implemented with additional force sensors, such an additional back, and/or front, force sensors, as schematically illustrated in FIGS. 9A-9B.

The foregoing is illustrative of the present invention, and is not to be construed as limiting thereof. The invention is defined by the following claims, with equivalents of the claims to be included therein.

We claim:

1. A method of forming a three-dimensional object, comprising:
    (a) providing an apparatus comprising an elevator assembly, a drive assembly, a carrier, a platform coupler, a light transmissive window having a build surface, polymerizable liquid on the build surface, and a growing object on the carrier, the growing object produced by light polymerization of said polymerizable liquid, wherein the carrier is mounted to the elevator assembly and drive assembly by a platform coupler, and a pair of force sensors are included in the elevator assembly in spaced-apart locations,
    (b) vertically reciprocating said carrier with respect to said build surface in an upstroke and a downstroke, the downstroke being shorter than said upstroke, to form a build region between said growing object and said build surface, and to fill said build region with the polymerizable liquid, while also:
        (i) sensing force exerted between said carrier and said build surface through said growing object and said polymerizable liquid during said upstroke; and
        (ii) modifying the speed, acceleration, or both speed and acceleration of said upstroke in response to the sensed force so that the sensed force approaches a predetermined target force; then
    (c) irradiating said build region with light through said light transmissive window to form a new portion of said object from said polymerizable liquid on said growing object, and then
    (d) repeating steps (b) through (c) to form additional portions on said growing object until said three-dimensional object is formed.

2. The method of claim 1, further comprising:
    (i) determining the surface area of the growing object facing said window during said vertically reciprocating step; and
    (ii) modifying said target force based on said determined surface area.

3. The method of claim 1, wherein said modifying step includes at least modifying the acceleration of said upstroke.

4. The method of claim 1, wherein said light polymerization of said polymerizable liquid is exothermic, and the viscosity of said polymerizable liquid decreases as said polymerizable liquid is thereby heated during successive repetitions of said steps (b) and (c).

5. The method of claim 1, wherein said window comprises a removable window cassette, and said target force is determined at least in part by the specific composition of said window cassette.

6. The method of claim 1, wherein said target force is determined at least in part by the specific composition of the light polymerizable liquid.

7. The method of claim 1, wherein said growing object is frangible.

8. The method of claim 1, wherein the final mechanical properties of said three-dimensional object are degraded by excessive application of force greater than said target force during production thereof.

9. The method of claim 1, wherein said vertically reciprocating step is carried out while maintaining a liquid interface between said growing object and said light transmissive window, said liquid interface comprising said polymerizable liquid.

10. The method of claim 1, wherein said polymerizable liquid comprises a dual cure polymerizable liquid.

11. The method of claim 1, wherein said build surface is fixed and stationary in the lateral (X and Y) dimensions.

12. An apparatus for forming a three-dimensional object from a polymerizable liquid, comprising:
    (a) an elevator assembly;
    (b) a carrier operatively associated with said elevator assembly on which carrier said three-dimensional object is formed;
    (c) a light-transmissive window having a build surface, with said build surface and said carrier defining a build region therebetween;
    (d) a liquid polymer supply operatively associated with said build surface and configured to supply liquid polymer into said build region for solidification or polymerization;
    (e) a light source configured to irradiate said build region through said window to form a solid polymer from said polymerizable liquid;
    (f) a drive operatively associated with said carrier;
    (g) a pair of force sensors included in the elevator assembly in spaced-apart locations, wherein the carrier is mounted to the elevator assembly and drive assembly by a platform coupler; and
    (h) a controller operatively associated with said carrier, said drive, and said light source for advancing said carrier away from said build surface to form said three-dimensional object from said solid polymer, said controller further configured to:
        (i) reciprocate said carrier vertically with respect to said build surface in an upstroke and downstroke to enhance or speed the refilling of said build region with said polymerizable liquid, and (ii) modify the speed, acceleration, or both speed and acceleration of said upstroke in response to force sensed by said pair of force sensors so that the sensed force approaches a predetermined target force.

13. The apparatus of claim 12, wherein said build surface is fixed and stationary in the lateral (X and Y) dimensions.

14. The apparatus of claim 12, wherein said pair of force sensors comprise a strain gauge.

* * * * *